March 29, 1960 W. R. BURNSIDE Re. 24,803

APPARATUS FOR PUMPING SOLIDS

Original Filed Aug. 24, 1953 2 Sheets-Sheet 1

INVENTOR.

Walter R. Burnside

APPARATUS FOR PUMPING SOLIDS

Original Filed Aug. 24, 1953 2 Sheets-Sheet 2

INVENTOR.

Walter R. Burnside.

United States Patent Office

Re. 24,803

Reissued Mar. 29, 1960

24,803

APPARATUS FOR PUMPING SOLIDS

Walter R. Burnside, Los Angeles, Calif., assignor, by mesne assignments, to Brawley Pump Company, San Gabriel, Calif.

Original No. 2,785,930, dated March 19, 1957, Serial No. 376,215, August 24, 1953. Application for reissue February 4, 1959, Serial No. 780,653

16 Claims. (Cl. 302—37)

Matter enclosed in heavy brackets [ ] appears in the original patent but forms no part of this reissue specification; matter printed in italics indicates the additions made by reissue.

My invention relates to pumps and equivalent devices which are capable of handling liquids and other fluent substances carrying considerable quantities of solids in suspension. It includes a novel kind of such apparatus and novel elements thereof, all of which cooperate to efficiently handle solids in suspension with a minimum of violent contact with the apparatus.

In an apparatus made according to the principle of my invention, *a rotary pump designed to have a minimal contact between the entrained solids carried by the fluid is provided by imparting a vortical flow to the pump fluid and entrained solids in a pump swirl chamber of divergent vortex-like generally conical shape defined at one end by the concave blade profile of a centrally apertured impeller element, the central aperture or eye of which forms a part of the pump inlet and a similarly formed spaced concentric convex face. Preferably* the shaft on which the impeller is mounted is hollow and serves to conduct the material thru the impeller-eye into the casing. The casing-wall *defining means* opposite the one thru which the material enters the casing acts as a deflector, aids in guiding the material thru the casing, and this wall *preferably is formed as a stationary casing wall member which* may be made removable, to permit easy access and removal of the impeller. The hollow shaft may be built in sections, to permit partial disassembly, for the convenient installation of belts, pulleys or other means of power-application.

This kind of apparatus is intended to be used primarily for handling solids in suspension. It can profitably be used in draining sumps and disposing of sewage, tailings, storm-waters and waste-liquids generally, despite the suspension therein of considerable quantities of solids, e.g., trash, litter, manure and general refuse which would be more likely to clog and damage any pumps now used for such purposes. Such apparatus, made according to my invention, can with equal profit be used to handle solids by means of their suspension in more fluent media, e.g., such solids as sand, gravel, coal, mineral ores in process and many others. Because of its simplicity, it is easily adapted to provide ready access to the interior for cleaning and inspection and therefore particularly adapted to the handling of food-stuffs and foods in process of preparation, such as fruits, vegetables, fish, soups and innumerable others.

Some of the objects of my invention are to provide a kind of apparatus which will handle solids in suspension with less wear of internal parts, less clogging and less damage to apparatus or solids than is possible with conventional pumps now used for such purposes, and to provide such apparatus which is also efficient, simple and easily built and maintained.

Figure 1:
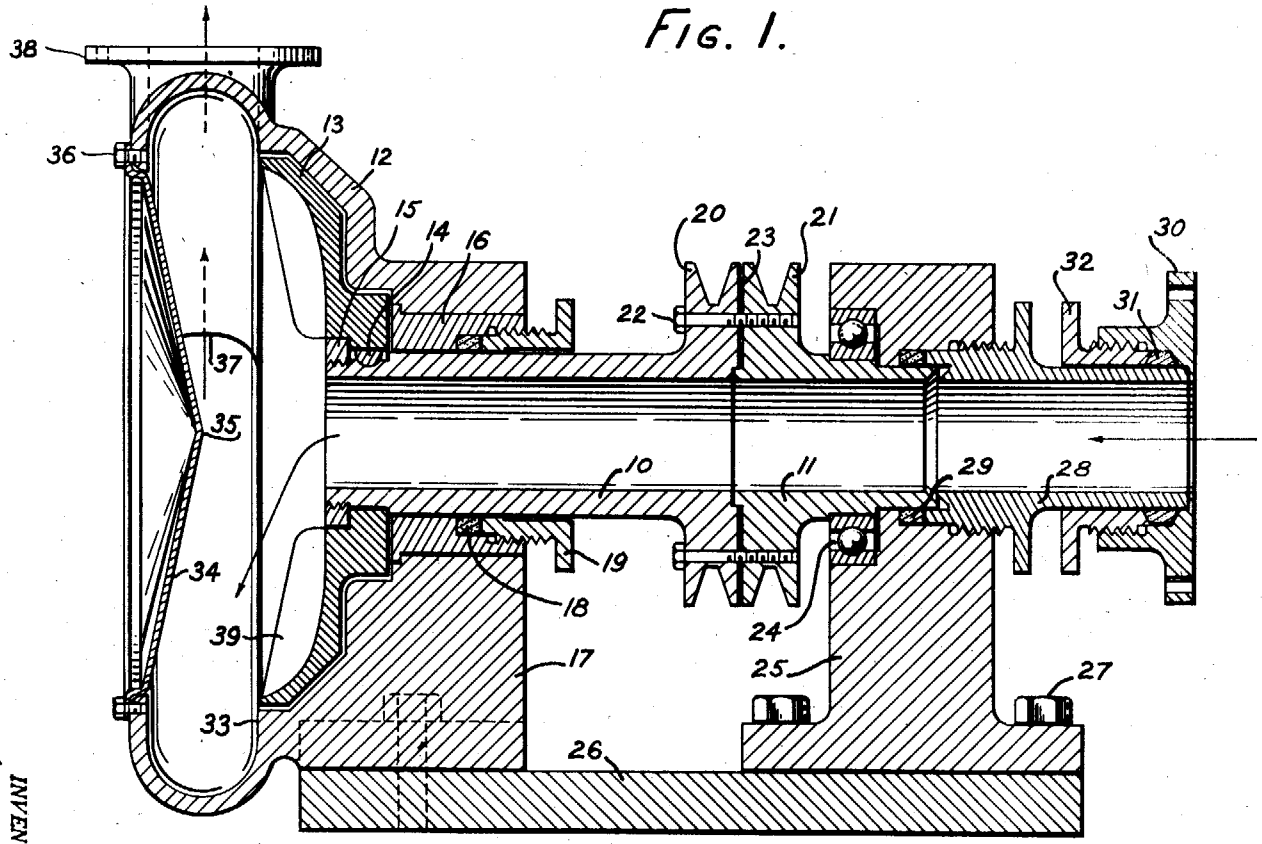
Figure 2:
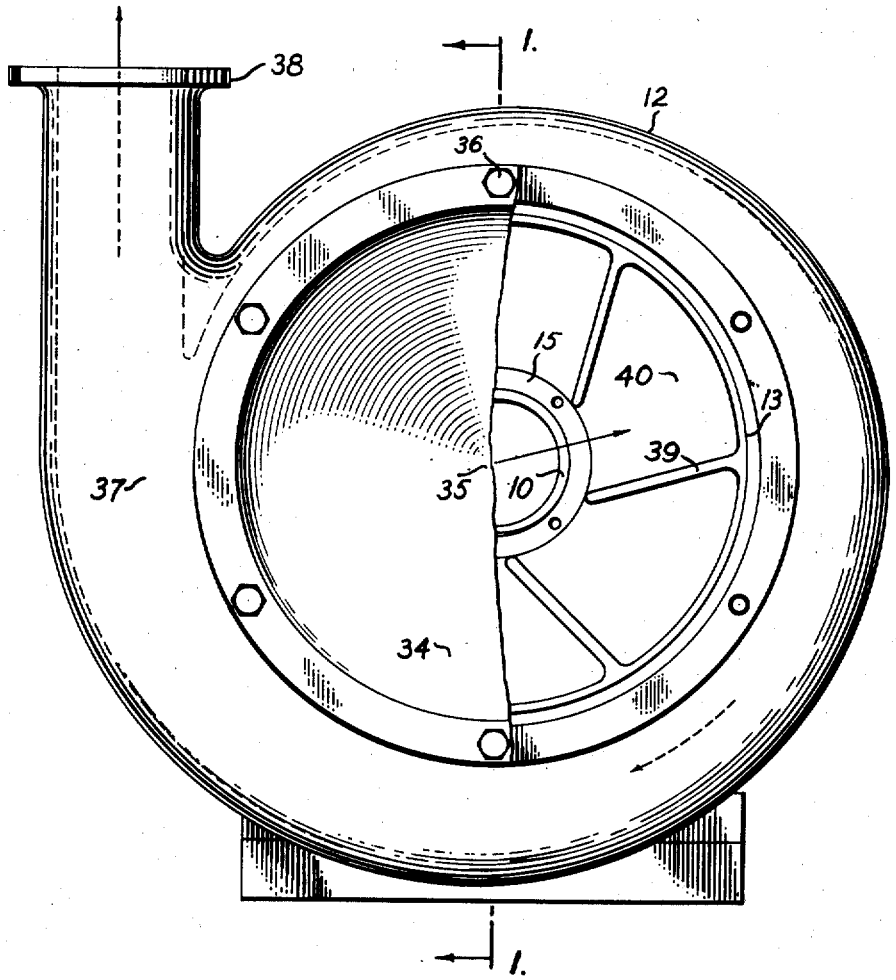

The principle of my invention is illustrated by the embodiment now described, with the aid of the drawings. My invention is of course not limited to such specific details as are here set forth, except by the claims themselves and any prior art. This embodiment is a pump, a longitudinal vertical section of which is shown in Figure 1. Figure 2 is an end-elevation.

Referring first to Figure 1, *the broad principle of the invention resides in providing a pump having an unobstructed vortex shaped swirl chamber defined by spaced opposed complementary convex and concave faces and which has a coaxial inlet directed axially into the eye of the vortex through the concave faces toward the convex face and a peripheral, preferably tangentially directed outlet. In the preferred form of the invention, the concave swirl chamber face is defined by the profile of the impeller blades on a rotatably mounted power driven impeller and fluid is introduced into the swirl chamber through the center of the impeller,* the hollow shaft is in two sections 10, 11. One end of the section 10 enters the pump-casing 12 and has mounted on that end an impeller 13, held in place with the key 14 and the impeller-lock-nut 15. The section 10 of the hollow shaft 10, 11 is mounted on a bearing 16 which is in turn supported by the bearing-support 17. Leakage of liquid from within the casing 12 during operation is prevented by the packing 18, which is held in position by the adjustable packing-nut 19.

In this embodiment, a drive-pulley 20 is integrally formed on one end of the section 10 of the hollow shaft 10, 11 and another pulley 21 is integrally formed on the adjacent end of the section 11, to transmit the necessary power for the rotation of the hollow shaft 10, 11 and the impeller 13. These pulleys 20, 21 are separably joined by means of circumferentially spaced bolts 22. The two sections of the hollow shaft 10, 11 and the two pulleys 20, 21 are separated by the gasket 23 to prevent leakage.

The hollow-shaft section 11 is mounted on the bearing 24, which is held by the bearing-support 25. Both of the bearings 16, 24 are automatically cooled by the liquid in the material being handled. The bearing supports 17, 25 are mounted on a base-plate 26 and secured for alignment by the suitably-placed bolts 27.

The conveyance of the material into the rotating, hollow shaft 10, 11 is achieved by means of an adjustable, stationary hollow-shaft-extension 28. This extension 28 is threaded to permit its being screwed into the bearing-support 25 and against a packing 29. Clearance is provided between the stationary hollow-shaft-extension 28 and the rotating, hollow shaft 10, 11, and leakage thru this clearance is prevented by screwing the said extension 28 against the packing 29.

To facilitate the connection of the hollow-shaft-extension 28 with a fixed supply-line, not shown, without impairing the adjustability of the hollow-shaft-extension 28, a flange 30 is slidably mounted on the extension 28. The flange 30 is provided with a packing 31, held in place by the packing-nut 32, by which means leakage between the flange 30 and the hollow-shaft-extension is prevented.

The perimeter of the casing 12 is volute in form and is provided with two opposing *spaced respectively concave and convex concentric* walls 33, 34. The wall 33, thru which the hollow-shaft section 10 enters the casing 12, is recessed to *form an impeller recess or chamber adapted to* receive the impeller 13. This wall 33, I will call the entrance-wall 33. The end-wall 34, opposite the entrance-wall 33, is removable and substantially conical in form, with the cone's apex 35 toward the center of the entrance-wall 33. The end-wall 34 is secured in position by circumferentially-spaced bolts 36. The opening created by the removal of the end-wall 34 is large enough to permit the removal of the impeller 13.

*The convex surface of conoidal end-wall 34 is spaced from, opposed to and generally parallels the concave*

*conoidal downstream equiangularly pocketed end face of the entrance end impeller element and cooperates therewith and with the peripheral volute wall of casing 12 to form a generally conoidal flow path or swirl chamber in the general form of a vortex, the upstream end of which directly communicates with the impeller chamber and the pump inlet through the impeller. The peripheral volute wall of casing 12 lies along a path of progressively increasing radius from a point in the upper left hand quadrant of the casing as seen in Figure 2 to the point where it intersects the horizontal radius defining the lower edge of the upper left hand quadrant. At this latter point, the chamber wall merges into a tangentially upwardly directed cylindrical wall portion forming the wall of a tangentially outlet or eduction channel 37 terminating in an eduction port-flange 38.*

The said end-wall 34 serves as a deflector and tends to confine the flow of the material to its natural course, toward the eduction-channel 37. The apex 35 is spaced from the impeller 13 sufficiently to permit the passage of solids clear of the impeller 13. The end-wall 34 "takes" the wear that would be taken by the impeller of a conventional, centrifugal pump. Being simple in construction, the removable end-wall 34 can be cheaply replaced.

In Figure 2 are shown the casing 12, with its eduction-port-flange 38, the end-wall 34, with the bolts 36 securing it to the casing 12, and partially broken away to show the end of the hollow-shaft section 10, with the impeller 13 mounted thereon, the impeller vanes 39, the webbing 40 and the impeller-lock-nut 15, which is provided with holes for the insertion of the prongs of a wrench with which to remove the impeller-lock-nut 15.

*As will be apparent from an inspection of Figure 1, the impeller chamber or recess lies immediately between casing entrance end-wall 33 and the conical swirl chamber. Due to their inertia in the direction axially of the impeller away from the impeller, the entrained solid particles, upon passing through the impeller inlet opening, will move into and through the vortical flow pattern in the swirl chamber to the peripheral outlet with little or no wear producing contact with the blades or vanes 39 of the impeller or the wall 34. As a consequence, the entering solids tend to move forwardly into the swirling fluid mass and be thrown generally radially outwardly by the swirling fluid mass toward the swirl chamber outlet and thus are effectively directed to minimize direct contact with the impeller element and its blades and with the opposed wall 34. It, therefore, will be appreciated that the enhanced vortical flow pattern produced by the conical swirl chamber and the novel impeller eye inlet of this invention produces an exceedingly efficient wear minimizing pump for handling fluids having substantial quantities of entrained solids.*

I claim:

1. In an apparatus capable of handling solids carried in suspension by fluent substances, the combination of: (a) a tube or pipe mounted for rotation on its longitudinal axis and adapted to receive the application of power for such rotation, one end of which tube is adapted to receive the material to be handled and the other end of which has an impeller mounted thereon for rotation; (b) a casing enclosing said impeller and having an eduction-port and two opposed walls, one wall having an opening to receive the end of the tube on which the impeller is mounted, the opposite wall being inwardly convex with its apex toward the center of the entrance-wall, next above mentioned; (c) the said inwardly-convex wall being removably affixed to the casing, whereby to afford access to the casing-interior; (d) the said tube being longitudinally divided and separately joined, whereby to facilitate partial disassembly.

2. In an apparatus capable of handling solids carried in suspension by the fluent substances, the combination of: (a) a tube or pipe mounted for rotation on its longitudinal axis and adapted to receive the application of power for such rotation, one end of which tube is adapted to receive the material to be handled and the other end of which has an impeller mounted thereon for rotation; (b) a casing enclosing said impeller and having an eduction-port and two opposed walls, one wall having an opening to receive the end of the tube on which the impeller is mounted, the opposite wall being inwardly convex with its apex toward the center of the entrance-wall, next above mentioned; and (c) the said inwardly-convex wall being removably affixed to the casing, whereby to afford access to the casing-interior.

3. In an apparatus capable of handling solids carried in suspension by fluent substances, the combination of: (a) a tube or pipe mounted for rotation on its longitudinal axis and adapted to receive the application of power for such rotation, one end of which tube is adapted to receive the material to be handled and the other end of which has an impeller mounted thereon for rotation; (b) a casing enclosing said impeller and having an eduction-port and two opposed walls, one wall having an opening to receive the end of the tube on which the impeller is mounted, the opposite wall being inwardly convex with its apex toward the center of the entrance-wall, next above mentioned; and (c) the said tube being longitudinally divided and separably joined, whereby to facilitate partial disassembly.

4. In an apparatus capable of handling solids carried in suspension by fluent substances, the combination of: (a) a tube or pipe mounted for rotation on its longitudinal axis and adapted to receive the application of power for such rotation, one end of which tube is adapted to receive the material to be handled and the other end of which has an impeller mounted thereon for rotation; and (b) a casing enclosing said impeller and having an eduction-port and two opposed walls, one wall having an opening to receive the end of the tube on which the impeller is mounted, the opposite wall being inwardly convex with its apex toward the center of the entrance-wall, next above mentioned.

*5. In a pump for handling solids entrained in a fluid, a casing having spaced sidewalls peripherally connected by a volute wall, means defining an inlet in one of said sidewalls and an outlet in said volute wall, an impeller rotatably mounted within said chamber coaxial with said inlet, said impeller having an imperforate wall disposed closely adjacent to one wall of said chamber and a plurality of blades projecting from said impeller imperforate wall toward the other wall of said casing and terminating axially of said impeller in axial end faces lying in a common surface of revolution exposed to and spaced from said other end wall of said casing to define with said casing other end wall an unobstructed swirl chamber for fluid passing through said casing between said inlet and said outlet, said axial end faces of said impeller blades extending between the center and the periphery of said imperforate wall and terminating in circumferentially spaced radial end faces at at least one of their ends, the space between said impeller blade radial end faces being unobstructed so that fluid may pass radially between said blades at their said one end.*

*6. The combination defined in claim 5 wherein said axial end faces of said impeller blades merge into said impeller imperforate wall at their other ends so that radial fluid flow between said blade other ends is precluded.*

*7. In a pump for handling solids entrained in a fluid, a first member having a face in the form of a concave surface of revolution and having a coaxial inlet formed therethrough, a second member having a face in the form of a convex surface of revolution and mounted in concentric axially spaced relation to said first member face to define a swirl chamber between said faces in the general shape of a vortex through which fluid and entrained solids pass from said inlet, a housing having an*

*outlet therein surrounding the periphery of said members, at least one of said members being mounted for rotation concentric with the axis of said surface of revolution of its said face and having a plurality of equiangularly spaced pockets formed in its said face and defining therebetween a plurality of equiangularly spaced blades equiangularly inclined with respect to the axis of rotation of said one member, said one member being said first member.*

*8. In an apparatus for handling solids entrained in a fluid: a casing defining a volute chamber having a coaxial inlet, a circumferential outlet and axially spaced opposed end face defining means supported in said casing, said end face defining means being in the form of complementary concave and convex surfaces of revolution sloping away from said inlet and defining a flow path therebetween interconnecting said inlet and said eduction outlet, at least the one of said end face defining means on the inlet side of said chamber comprising an impeller element having blades thereon at one side of and facing toward said flow path and adapted upon rotation of said impeller element to create a vortical flow of fluid and its entrained solids from said inlet through said flow path past said impeller to said outlet thereby minimizing impingement of said entrained solids on said impeller and its blades and said opposed end face defining means.*

*9. In an apparatus for handling solids entrained in a fluid: a casing defining a volute chamber having a coaxial inlet, a circumferential eduction outlet and axially spaced opposed end face defining means supported in said casing, said end face defining means being in the form of complementary concave and convex surfaces of revolution sloping away from said inlet and defining a flow path therebetween interconnecting said inlet and said eduction outlet, at least one of said end face defining means comprising an impeller element having blades thereon at one side of and facing toward said flow path and adapted upon rotation of said impeller element to create a vortical flow of fluid and its entrained solids from said inlet through said flow path past said impeller to said outlet thereby minimizing impingement of said entrained solids on said impeller and its blades and said opposed end face defining means, said one end face defining means being disposed adjacent to and in surrounding relation to the coaxial inlet discharge end and being centrally apertured opposite said inlet to admit introduction of said fluid and its entrained solids directly into said flow path through the impeller element aperture.*

*10. In an apparatus for handling solids entrained in a fluid: a casing defining a volute chamber having a coaxial inlet, a circumferential eduction outlet and axially spaced opposed end face defining means supported in said casing, said end face defining means being in the form of complementary concave and convex surfaces of revolution sloping away from said inlet and defining a flow path therebetween interconnecting said inlet and said eduction outlet, at least the one of said end face defining means on the inlet side of said chamber comprising an impeller element having blades thereon at one side of and facing toward said flow path and adapted upon rotation of said impeller element to create a vortical flow of fluid and its entrained solids from said inlet through said flow path past said impeller to said outlet thereby minimizing impingement of said entrained solids on said impeller and its blades and said opposed end face defining means, said opposed end face defining means having generally parallel opposed portions extending radially outwardly from and forwardly of the inner end of said coaxial inlet to define a substantially conoidal, annularly extending swirl chamber between said inlet and said outlet.*

*11. In an apparatus for handling solids entrained in a fluid: a casing having an end wall, a peripheral wall defining a swirl chamber and an impeller chamber in adjacent axial relation between said end wall and said swirl chamber; a coaxially disposed inlet having a port extending through said end wall to deliver said fluid and the entrained solids to the center of said swirl chamber; and a tangential outlet having a port extending through said peripheral wall and communicating with said swirl chamber at its periphery; end wall defining means opposed to said one end wall; and rotatable impeller means supported by said casing for concentric rotation in said impeller chamber, said impeller means comprising a centrally apertured member having impeller blade defining recesses in the face thereof opposed to said end wall means and lying radially outwardly of said inlet port along the adjacent end of said swirl chamber and being effective upon rotation to impart a vortical flow to the fluid and entrained solids passing into and through said swirl chamber whereby pumping of said fluid and its entrained solids through said swirl chamber to said outlet port is effected by the fluid vortex created by said impeller blades.*

*12. The apparatus of claim 11 wherein said end wall means and said centrally apertured plate member provide generally uniformly spaced opposed swirl chamber end wall means extending radially outwardly from and forwardly of the inner end of said inlet port to define a substantially conical, annularly extending swirl chamber between said inlet port and said outlet port, said outlet port being located at the periphery of said swirl chamber at the point along the periphery of said conical swirl chamber where the vortical flow of said fluid and its entrained solids intersects the periphery of said swirl chamber thereby minimizing contact between said entrained solids and said casing walls and said impeller means.*

*13. A pump impeller for handling solids entrained in a fluid: comprising a radial body having a coaxial, centrally disposed inlet eye, a blade support face extending radially outwardly and axially forwardly from one end of said inlet eye to form a generally conical forwardly overhanging annular wall surface and impeller blading rigidly mounted on said annular wall surface at equiangularly spaced intervals and protruding therefrom and extending in chordal fashion along said wall surface toward said inlet eye to form a generally conically shaped well at said one end of said inlet eye.*

*14. A pump impeller comprising a body member having a concave surface of revolution, means defining a fluid port through said member coaxial with and intersecting said surface, said surface having a plurality of equiangularly spaced pockets formed therein and defining therebetween a plurality of equiangularly spaced blades equiangularly inclined with respect to the impeller axis.*

*15. A rotary pump chamber and impeller assembly for handling solids entrained in a fluid: comprising a casing defining a chamber, having generally conical spaced end wall means including an impeller comprising a radial body having a coaxial, centrally disposed inlet eye, a blade support face extending radially outwardly and axially forwardly from one end of said inlet eye to form a generally conical forwardly overhanging annular wall surface and impeller blading rigidly mounted on said annular wall surface at equiangularly spaced intervals and protruding therefrom and extending in chordal fashion along said wall surface toward said inlet eye to form a generally conically shaped well at said one end of said inlet eye, said impeller being journalled by said casing with its said annular wall surface opposed to said end wall means and axially spaced therefrom to define therebetween a generally vortex-like swirl chamber for receiving and conveying entrained solids in a fluid pumped by said impeller blades from said inlet eye to the periphery of said swirl chamber.*

*16. In a pump for handling solids entrained in a fluid, means defining a swirl chamber in the general shape of*

*a vortex having a central coaxial inlet and a peripheral outlet through which fluid and entrained solids may pass from said inlet to said outlet, and means outside said swirl chamber on at least the inlet side of said chamber for inducing vortical flow of fluid in said swirl chamber from said inlet to said outlet whereby entrained solids may pass from said inlet to said outlet in the fluid stream without deleterious contact with said flow inducing means.*

References Cited in the file of this patent
or the original patent

UNITED STATES PATENTS

| | | |
|---|---|---|
| 772,606 | Brossmann | Oct. 18, 1904 |
| 1,315,028 | Martin | Sept. 2, 1919 |
| 1,319,364 | Skillins | Oct. 21, 1919 |
| 2,225,397 | Franks | Dec. 17, 1940 |
| 2,635,548 | Brawley | Apr. 21, 1953 |